Feb. 1, 1938.  W. A. EATON ET AL  2,107,110
POWER OPERATING MECHANISM
Filed Jan. 19, 1931   3 Sheets-Sheet 1

INVENTORS.
WILFRED A. EATON
STEPHEN VORECH
BY
H. O. Clayton
ATTORNEY

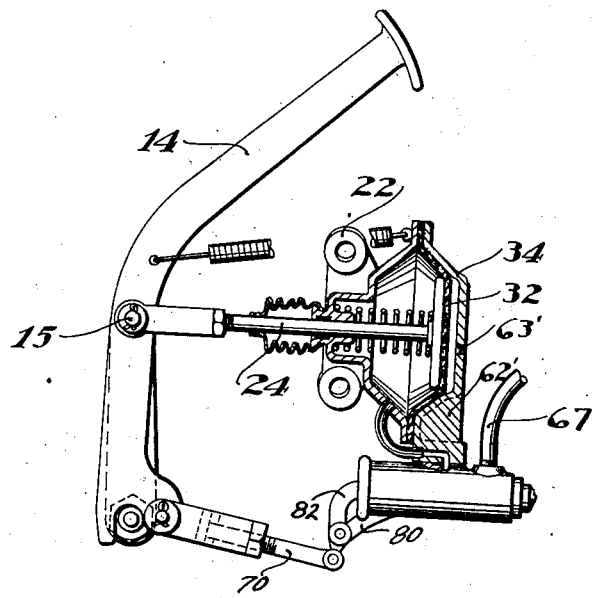
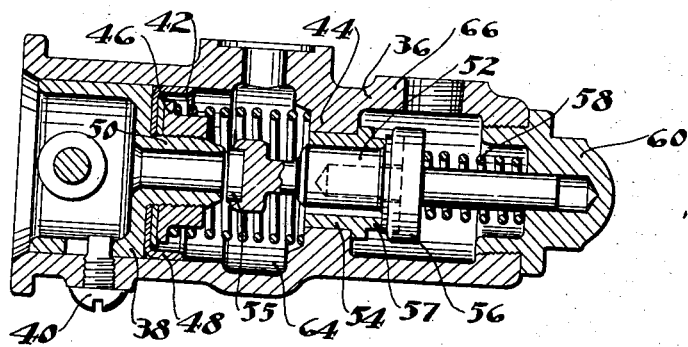

Patented Feb. 1, 1938

2,107,110

UNITED STATES PATENT OFFICE 2,107,110

POWER OPERATING MECHANISM

Wilfred A. Eaton and Stephen Vorech, Pittsburgh, Pa., assignors to Bendix Westinghouse Automotive Air Brake Company, Pittsburgh, Pa., a corporation of Delaware Application January 19, 1931, Serial No. 509,856

5 Claims. (Cl. 121—41)

This invention relates to power operating mechanism and is illustrated and described as applied to the clutch mechanism of an automotive vehicle.

It is to be understood however, that the invention is not limited to such application, but may be applied to other elements to be driven in an automotive vehicle such as the brake mechanism, or to control mechanism of an airplane, to the steering and control mechanism of motor boats, or to other analogous applications, such as the shifting of clutches and the setting in operation of automatic machinery in factories.

However, the principal object of the invention is to provide a simple and compact construction which may readily cooperate with the clutch or brake mechanism of the conventional automotive vehicle.

A further object of the invention is to provide an operating mechanism so designed as to permit either concurrent manual and power operation or complete manual operation in case of failure of the power mechanism, the design being also such as to apprise the operator at all times during the operation of the mechanism of the degree of power output; this so-called "feel" being a function of either the combined output of the valve and power unit or of the valve unit alone.

Yet another object is to provide a very reliable structure wherein a graduated control of the power unit is obtained and to this end there is suggested the employment of a self-lapping valve unit, which permits of both progressive and intermittent application of the power unit.

In order that the invention in its various aspects may be readily understood and appreciated by those skilled in the art, two embodiments of the invention are set forth hereinafter by way of description and exemplification in the accompanying drawings. It will be readily appreciated however, that the description and drawings are illustrative only and are not to be taken in an unnecessarily limiting sense.

Figure 4 is a view of a unit similar to that disclosed in Figure 2 disclosing a modified form of connection between the fluid motor and operating lever, the unit being vacuum operated;

Figure 5 is an enlarged view of the self-lapping valve structure of Figure 2 in longitudinal section.

Figure 1:
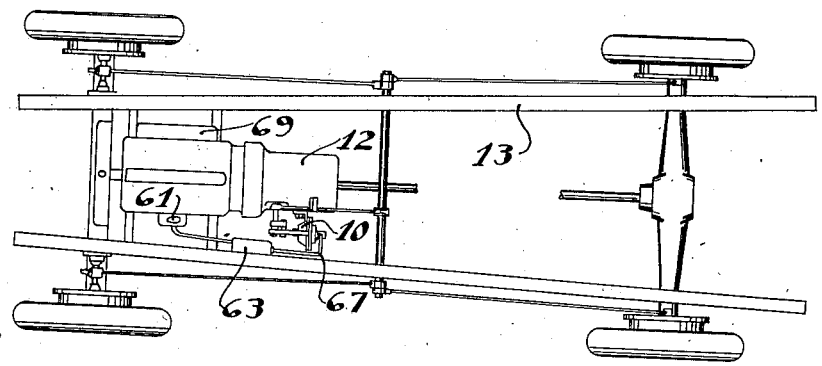
Figure 1 is a view disclosing diagrammatically an automobile chassis with my novel power operating mechanism incorporated therein shown as controlling the operation of the clutch, the mechanism being pressure operated.
Figures 2, 3:
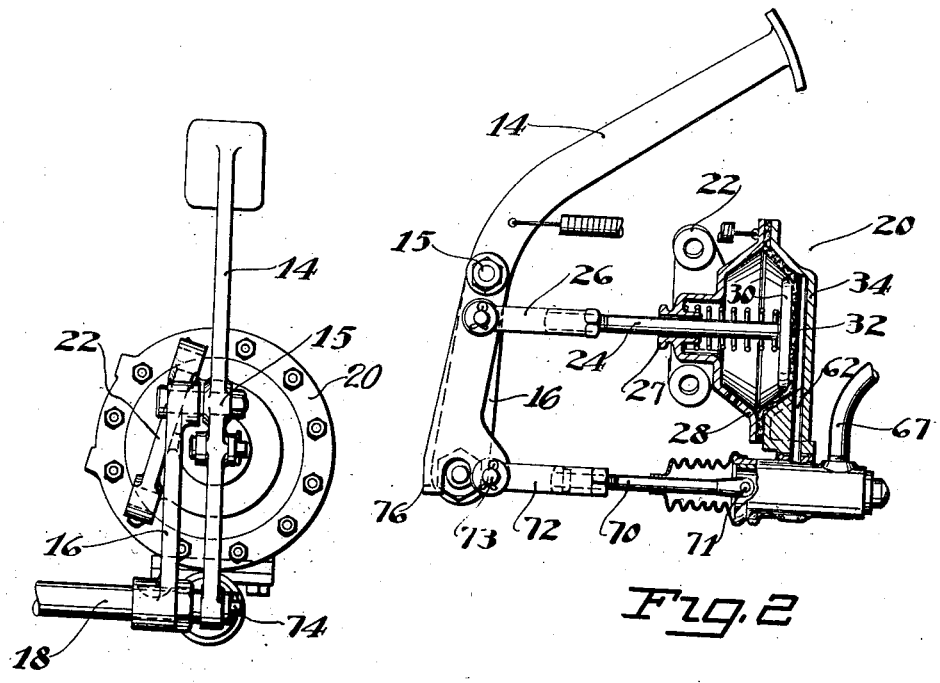
Figure 2 is a side elevation, partly in section, disclosing the power unit in greater detail.
Figure 3 is a front elevation of the unit disclosed in Figure 2.

In that embodiment of our invention illustrated in detail in Figures 1, 2 and 5, there is disclosed a clutch operating power unit 10 mounted on the transmission case 12 on the chassis 13 of a conventional automotive vehicle.

As disclosed, we have shown the operating unit adapted to actuate the clutching mechanism of the conventional vehicle. A pedal lever 14, which may be substituted for the conventional foot operated clutch lever, is preferably pivoted at 15 intermediate its ends to the end of a clutch throw out crank arm 16, the latter being keyed or otherwise fixedly secured to the clutch shaft 18 protruding from the clutch and change gear housing 12.

The power motor or prime mover 20 is preferably of the fluid operated type and is rigidly secured to the transmission or a chassis part by bracket 22. The connecting rod 24 of the motor is preferably adjustably connected to a yoke member 26, the latter being pivotally connected to the lever 14 below the pivot 15. The connecting or push rod 24 extends through a bearing 27 in the end of the non-pressure plate 28 of the fluid motor and to the head of the rod is secured the conventional push plate 30 which is adapted to be acted upon by the usual flexible diaphragm member 32. The pressure supporting plate 34 of the motor is preferably formed on its base to receive the valve operating mechanism for the motor to be described hereinafter.

The valve unit, detailed in Figure 5, preferably comprises a casing 36 adapted to receive a piston stop 40, limiting the motion of the piston to the left, may be threadedly secured to the valve casing. A piston return spring 42 may be interposed between an annular flange or stop 44 within the cylinder casing and a nut 46 securing a piston packing ring 48 in place, the nut 46 being threadedly mounted upon a hollow stem portion 50 of the piston. The remainder of the valve structure comprises a slotted cylindrically shaped valve member 52 slidably received within a sleeve or bushing 54 in the flange 44, the seat 55 of the valve member being slightly spaced, in its inoperative position, from the end of the hollow stem 50 of the piston 38. The valve member is provided with an enlargement or collar 56 adapted to seat on the end of the bushing 54, a normally compressed valve returning spring 58 being interposed between said collar 56 and an end plug 60 of the valve casing to retain the collar 56 seated against the bushing end constituting a valve seat 57. A duct 62 is provided to connect the motor and chamber 64 defined by the flange 44 and piston 38, and the valve casing is also provided with an outlet 66 to receive a conduit 67 extending either to a source of air pressure (Figures 1 and 2) such as the conventional compressor 61 or to the vacuum producing intake manifold 69 of the engine (Figure 1).

To the valve piston is secured a connecting rod 70 by means of wrist pin 71 which rod is adjustably secured to a yoke 72 pivotally secured at 73 to the inner end of the operating lever 14. The end of the lever is furthermore forked at its end to straddle a projecting stub portion 74 on the clutch shaft. The clearance between the outer furcation 76 of the fork and the stub shaft is of a degree to permit the complete cracking of the valve.

The figures of the drawings disclose the operating mechanism in its off position, that is, with the clutch engaged. If a pressure is now exerted on the foot pad at the end of the pedal lever the latter will tend to rotate counterclockwise about the pivot 15 as a fulcrum, thus exerting a force tending to rotate crank arm 16 and the clutch shaft in the same direction and at the same time transmitting a force to the right on push rods 24 and 70 of the power unit and valve respectively.

Movement of the valve push rod 70 causes a movement of the piston 38 to the right until the valve seat at 55 rests against the end of the stem 50, thus closing the atmospheric passage to the motor through the stem 50. Further motion of piston 38 to the right carries the valve member 52 with it and moves the intake portion of the valve or collar 56 away from its seat 57. This action serves to admit air under pressure from the reservoir 63 to chamber 64 and thence through passage 62 to the motor where the pressure fluid acts on diaphragm 32 causing the latter to exert a force to the left on connecting rod 24. A pressure differential is also set up between the chamber 64 and the outer face of the piston 38 tending to force it and the push rod 70 to the left.

We have then three forces acting on pedal lever 14 about the pivot 15 as a fulcrum; the counteracting force of the operator, through his foot, tending to maintain the lever in rotational equilibrium and the forces from the push rods 24 and 70 of the power unit and valve respectively. When the additive effect of these three forces is sufficient to overcome the static friction of the parts and also the static load of the clutch spring, the angular movement of the clutch throw out crank 16 ensues, thus disengaging the clutch.

If for any reason it is desired to maintain the clutch spring only partially compressed such as to effect a slipping clutch, or if a brake cross shaft is being actuated in lieu of the clutch and partial application of the brake is desired, this is accomplished by the operator retaining his foot momentarily stationary, whereupon air will continue to enter by the valve seat 57 until it forces diaphragm 32 to the left sufficiently to move the lower end of lever 14 to the left permitting the piston 38 to move to the left and the intake valve to close against its seat 57. During this operation, the foot of the operator serves as a fulcrum for the lever 14. When the intake valve has closed, a condition of equilibrium is established in the system, the forces tending to rotate the pedal lever about the foot as a fulcrum, being balanced by the counteracting force of the clutch mechanism. The clutch or brake is thus held in its applied position, the valve being in the so-called lapped condition.

If it is desired to further release the clutch or apply the brake, it is merely necessary to again move the foot forwardly whereupon pivot 15 again becomes a fulcrum, the valve being again cracked to thus admit an additional amount of air under pressure and effect a further increment of power input.

When it is desired to re-engage the clutch or release the brake it is merely necessary to reduce the manual pressure on the pedal lever which will effect a momentary venting of the valve to atmosphere with a consequent reduction of air pressure in the motor. This effects an increment of releasing movement to the clutch or brake mechanism. The above action is due to the self-lapping effect of the valve but for ordinary purposes a graduated release is not desired, in which case the manual pressure is completely removed from the pedal lever effecting an immediate and complete venting of the motor with the consequent quick return of the parts to their original position.

In case of complete failure of the power motor, the brake or clutch is manually operated by the lever 14 which fulcrums on the stub shaft 74. Concurrent manual and power operation may also be effected with the lever fulcruming on shaft 74, the motor and operator imparting a load on the lever above the fulcrum. This condition may exist when the maximum pressure of the fluid motor is inadequate.

It is evident from the above description that during the normal operation of the mechanism, that is with the motor at maximum efficiency, the lever 14 functions intermittently as a lever of the first and second class, the most appreciable factors of the power input, namely the additive effect of the fluid motor and valve being offset by the manual effort of the driver in maintaining rotational equilibrium about the pivot 15. The reactionary effect of the valve and motor gives the much desired "feel" by which the driver is apprised at all times during the operation of the mechanism, of the degree of power operation. In other words, the greater the push upon the lever 14 from the connecting rods 24 and 70 the greater the reaction upon the driver's foot.

Figure 6:
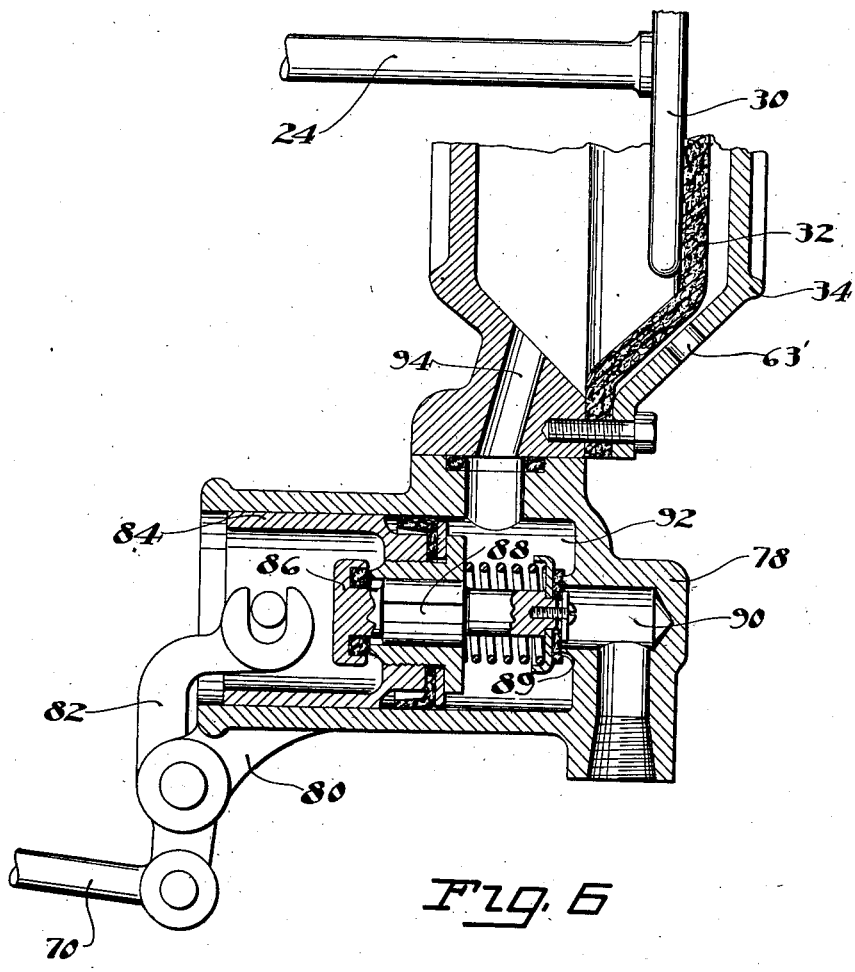
Figure 6 is a view similar to Figure 5 disclosing the valve structure employed in the vacuum operation of the mechanism as disclosed in Figure 4.

It may be desired however, to dispense with the reactive effect of the fluid motor in which case the connecting rod 24 is pivoted directly to the pivotal mounting 15. This structure is disclosed in Figure 4. It may also be desired to employ the well-known vacuum of the intake manifold of the motor as a means for obtaining the necessary pressure differential for effecting fluid pressure operation of the motor. With this means for actuating the motor a modified form of valve is necessary and one embodiment of such valve is disclosed in Figure 6. This structure embodies a valve casing 78 rigidly secured to the motor housing, the casing being provided with a bracket 80 pivotally mounting a lever 82. The valve rod 70 is pivotally secured to one end of said lever, the other end having a loose connection with the wrist pin of a valve piston 84.

A valve member 86, slotted in its central portion at 88, is constructed at its ends to form intake and exhaust valves respectively. With the valve mechanism inoperative, that is, with the clutch engaged, the position of the parts is as disclosed in Figure 6, the exhaust valve being slightly open or spaced from its seat in the hub portion of the valve piston 84.

Upon actuation of the valve through the movement of rod 70 and lever 82 the valve piston 84 is moved to the left first closing the exhaust valve and thereafter moving the valve member 86 bodily to the left to open the intake valve at its seat 89. The left side of the servo motor is then placed in circuit, through the intermediary of port 90, valve chamber 92 and duct 94, with the induction source to create a vacuum in the motor, the said source preferably being the intake manifold of the engine.

Should the valve controlling pedal 14 be held constant, the valve mechanism automatically laps by virtue of the pressure differential acting on the valve piston together with the effect of the motor connecting rod movement as previously described. This lapping effect is manifested by the movement of the valve piston together with the valve member 86 bodily to the right to seat the intake valve without however opening the exhaust valve.

Further increments of clutch release pressure may be had by continuing the application of the valve to again open the intake valve. Upon release of the pedal 14, the intake valve seats and the exhaust valve opens to admit air under atmospheric pressure to the heretofore evacuated left side of the motor, thereby establishing an equilibrium of pressures in the servo motor to engage the clutch.

With this structure, the effect on the clutch mechanism is exactly the same as with the air or pressure operated valve mechanism heretofore described. The rod 24 is placed under compression to actuate the clutch from the servo motor and it is furthermore to be noted that the vacuum control valve structure provides the same desired "feel" as heretofore described to apprise the driver of the degree of clutch application.

While we have illustrated and described somewhat in detail several embodiments of our invention, it is not our intention to limit the scope of the invention to these particular embodiments or otherwise than by the terms of the appended claims.

We claim:

1. Power operated apparatus for motor vehicles comprising a vehicle controlling member, means for operating said member by power including a motor having a movable power-operated element operatively connected with said member, valve means for controlling the passage of motive fluid to and from said motor and for maintaining fluid therein to hold said member in a predetermined position, a valve operating lever pivotally mounted intermediate the ends thereof on said vehicle controlling member, one end of said lever being connected with said valve means to operate the latter during relative pivotal movement between said lever and member, the other end of said lever being adapted to be manually actuated to effect said pivotal movement of said lever with respect to said member, means positioned adjacent the first named end of said lever for limiting the extent of said relative pivotal movement, and a pressure responsive element associated with said valve means and directly and non-yieldingly connected with said one end of the lever, said pressure-responsive element being subjected to the pressure of the fluid conducted to and from said motor and thereby offering a resistance to said relative pivotal movement in a degree proportional to the power required to operate said vehicle controlling member.

2. Power operating mechanism comprising in combination with an angularly movable member to be actuated, a shaft for mounting one end of said member, a manually controlled lever member pivotally mounted intermediate the ends thereof on said actuated member, one end of said lever member having a lost motion connection with said shaft, a fluid motor operatively connected with said actuated member, and a valve structure directly connected to said lever member and operated during relative pivotal movement of the latter with respect to said actuated member to take up said lost motion, said valve controlling the flow of fluid to and from the motor and adapted to maintain fluid therein to hold said angularly movable member in a predetermined position, said valve including a pressure-responsive element directly and non-yieldingly connected to said lever member and subjected to the pressure of the fluid conducted to and from said motor and thereby offering a resistance to said relative pivotal movement in a degree proportional to the power required to actuate said angularly movable member.

3. Power operated apparatus for motor vehicles comprising a vehicle controlling element, means for operating said element comprising an angularly movable arm directly connected at one end thereof to said element, a servo-motor having a power operated member operatively connected with said arm at a point spaced from the connection between the latter and said element to effect angular movement of the arm, valve means for controlling the admission and exhaust of fluid to and from said servo-motor and for maintaining fluid therein to hold said element in a predetermined position, means for controlling said valve means comprising a manually operable lever pivotally mounted intermediate its ends on said arm, means for directly and non-yieldingly connecting one end of said manually operable lever to said valve means, means associated with said last named end for positively limiting the extent of pivotal movement of said manually operable lever with respect to said arm, and means including a pressure responsive element associated with said valve means, connected with said connecting means and subjected to the pressure of the fluid conducted to and from said servo motor when said valve means is operated in response to relative pivotal movement of the manually operable lever with respect to said arm, said pressure responsive element thereby offering a resistance to said relative pivotal movement in a degree proportional to the power required to operate said vehicle controlling element.

4. In a power controlling mechanism for motor vehicles, a manually operable member, a vehicle controlling element, a fluid motor operatively connected to said element, means including a pair of pivotally-connected members for connecting said manually operable member and element, and valve means operable in response to relative pivotal movement of one of said last named members with respect to the other for controlling the flow of fluid to and from said motor and for maintaining fluid therein to hold said element in a predetermined position, said valve means including a pressure-responsive element directly and non-yieldingly connected with one of said pair of members and subjected to the pressure of the fluid conducted to and from said motor and thereby offering a resistance to said relative pivotal movement in a degree proportional to the power required to actuate said controlling element.

5. Power operated apparatus for motor vehicles comprising a vehicle controlling element, means for operating said element comprising a movable member, a servo-motor having a power operated member operatively connected with said movable member to effect movement of the latter, valve means for controlling the admission and exhaust of power fluid to and from said servo-motor and for maintaining fluid therein to hold said element in a predetermined position, means for controlling said valve means comprising a manually operable lever pivotally mounted intermediate its ends on said first member, means for directly and non-yieldingly connecting one end of said manually operable lever to said valve means, means associated with said last-named end for positively limiting the extent of pivotal movement of said manually operable lever with respect to said arm, and means including a pressure responsive element associated with said valve means, connected with said connecting means and subject to the pressure of the fluid conducted to and from said servo-motor when said valve means is operated in response to relative pivotal movement of the manually operable lever with respect to said first member, said pressure-responsive element thereby offering a resistance to said relative pivotal movement in a degree proportional to the power required to operate said vehicle controlling element.

WILFRED A. EATON.
STEPHEN VORECH.